UNITED STATES PATENT OFFICE 1,993,039

ALIPHATIC AMINE SALTS OF HALOGENATED PYRIDONES CONTAINING AN ACID GROUP

Joachim Reitmann, Wuppertal-Vohwinkel, Germany, assignor to Winthrop Chemical Company, Inc., New York, N. Y., a corporation of New York No Drawing. Application September 22, 1932, Serial No. 634,450. In Germany October 15, 1931

20 Claims. (Cl. 260—42)

This invention relates to derivatives of halogenated pyridones containing acid groups capable of forming salts, which derivatives display a high solubility in water.

Halogenated pyridones containing acid groups capable of forming salts, such as halogen-pyridone-carboxylic and -sulphonic acids, are valuable for pharmaceutical purposes, particularly for rendering organs of the human or animal body visible in X-ray photography. However, the use of the said halogen-pyridone derivatives often encounters difficulties, since their metal salts hitherto used do not display a sufficient solubility in water. Particularly the dihalogenated pyridone derivatives often are so slightly soluble in water that their use in practice becomes impossible.

In accordance with the present invention derivatives of halogenated pyridones containing acid groups capable of forming salts, which display a high solubility in water, are obtainable by transforming, according to the methods customary for the formation of salts, the said halogenated pyridone compounds into their salts with an aliphatic amine, such as alkyl-, dialkyl and trialkylamines. I prefer to prepare the salts with secondary or tertiary aliphatic amines, such as dimethylamine, diethylamine, dipropylamine and triethylamine. Particularly those secondary and tertiary amines which contain oxygen groups such as the hydroxy-, keto- and the ether-like bound oxygen group, have proved suitable for the manufacture of readily soluble halogen-pyridone salts. Since the basic character of the aliphatic amines is utilized in my new salt formation process, the amino groups of the aliphatic amines should not be substituted by acid groups which diminish the basic character of the amines.

The halogenated pyridones containing an acid group capable of forming salts which may be transformed in accordance with the present invention into derivatives readily soluble in water may contain one or more halogen atoms and one or more acid groups capable of forming salts. The acid groups may be attached to a ring carbon atom or to the ring nitrogen atom.

The carboxylic and sulphonic acid groups, which may be connected with the pyridone nucleus by means of an aliphatic chain, as for instance, the acetic acid or the ethane sulphonic acid radical, are considered the most important examples of the said acid groups capable of forming salts. Other such groups are, for instance, the groups of the phosphoric acid and sulphinic acid group.

The greater solubility in water of my new amine salts as compared with the corresponding metal salts is of especial practical importance in connection with the diiodopyridone derivatives which are used as X-ray contrast media, but likewise the amine salts of brominated and chlorinated pyridone derivatives, displaying a surprisingly high solubility in water when compared with the corresponding metal, for instance, the corresponding alkali metal salts, are for many purposes more suitable than these metal salts.

My new amine salts of halogenated pyridones containing an acid capable of forming salts are colorless and odorless compounds. They are partly solid crystalline substances and partly viscous oils. Their solutions in water display a neutral or almost neutral reaction. The new salts are also readily soluble in alcohol.

My invention is further illustrated by the following examples without being limited to the details described therein:

Example 1

50.6 grams of 3.5-diiodo-4-pyridone-N-acetic acid are dissolved in a solution of 10 grams of diethylamine in 60 ccm. of water while heating. The solution is made up to 100 ccm. by the addition of water. 100 ccm. of this solution contain at room temperature (about 18° C.) 60 grams of the diethylamine salt or 50.6 grams of 3.5-diiodo-4-pyridone-N-acetic acid. By evaporating the solution and recrystallizing, the diethylamine salt is obtained in the form of white crystals of the melting point of about 173° C. It has the formula:

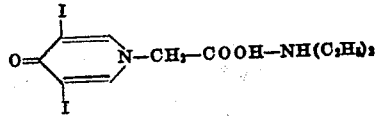

Contrary to the above solution, the corresponding sodium salt of 3.5-diiodo-4-pyridone-N-acetic acid saturated at room temperature contains only 33 grams of the sodium salt or 31.3 grams of the free acid.

By means of the ethylamine salt prepared in the above indicated manner an aqueous solution is obtainable which contains about 40 grams of the free acid in 100 ccm. of the solution at room temperature. By means of the bis-hydroxyethylamine salt, forming white crystals of the melting point of 153° C., about 35 grams of the free acid can be dissolved in 100 ccm. of the salt solution at room temperature. The bis-hydroxyethyl-salt has the formula:

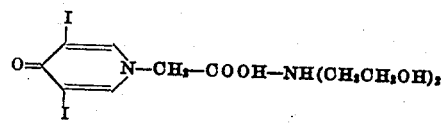

In an analogous manner highly concentrated solutions (containing up to about 80% of the salts) with the following bases: 2-keto-3-methyl-4-dimethylaminobutane, 1-ethoxy-2-hydroxy-3-dimethylaminopropane, 2-hydroxy-4-diethylaminobutane, 1.3-bis-diethylamino-2-hydroxypropane, bis-hydroxyethyl-amino-ethane, 1-hydroxyethoxy-2-diethylamino-ethane, 1-diethylamino-ethoxy-2-hydroxy-3-dimethylaminopropane, diethylamino acetic acid ethylester, diethylamino-ethyl-hydroxyethyl-thioether are obtainable.

Example 2

10.1 grams of 3.5-diiodo-2-pyridone-N-acetic acid are dissolved in an aqueous solution of 1.85 grams of diethylamine while heating. The solution is made up to 27 ccm. by the addition of water. In 100 ccm. of this solution 44 grams of diethylamine salt or 37.2 grams of 3.5-diiodo-2-pyridone-N-acetic acid are contained at room temperature. 100 ccm. of a saturated solution of the corresponding sodium salt contain only 16 grams of the sodium salt or 15.2 grams of the free acid. The diethylamine salt has the formula:

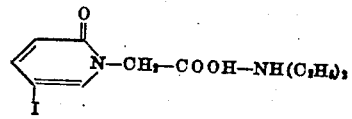

Highly concentrated aqueous solutions of salts of 3.5-diiodo-2-pyridone-N-acetic acid are likewise obtainable by using the other aliphatic amines mentioned in Example 1 for the production of an amine salt.

Example 3

The diethylamine salt of 5-iodo-2-pyridone-N-acetic acid obtainable in the above indicated manner yields an aqueous solution which contains more than 50 grams of the free acid in 100 ccm. of the aqueous salt solution at room temperature. By means of the sodium salt only about 23 grams of the free acid can be dissolved in 100 ccm. of the salt solution. The said diethylamine salt has the formula:

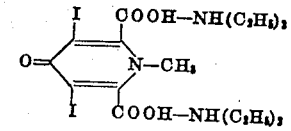

A similar solubility in water as the diethylamine salt displays, for example, the 1-ethoxy-2-hydroxy-3-dimethylamino-propane salt of the above mentioned acid.

Example 4

The diethylamine salt of 3.5-diiodo-chelidamic acid is obtainable in accordance with the directions of Example 1. This salt can be dissolved in water to a solution containing at room temperature in 100 ccm. 67 grams of the free acid. A concentrated aqueous solution of the sodium salt contains only about 55 grams of the free acid.

The diethylamine salt of 3.5-diiodo-N-methyl-chelidamic acid dissolves in water to a solution containing in 100 ccm. of the solution 100 grams of the free acid. A concentrated solution of the sodium salt contains only about 52 grams of the free acid at room temperature. The said diethylamine salt has the formula:

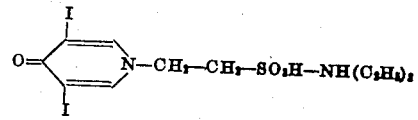

Example 5

The diethylamine salt of 3.5-diiodo-4-pyridone-N-ethanesulphonic acid prepared as indicated above dissolves in water to a solution containing at room temperature in 100 ccm. of the solution 21 grams of the free acid. 100 ccm. of a concentrated aqueous solution of the corresponding sodium salt contain only about 14 grams of the free acid at room temperature. The diethylamine salt has the formula:

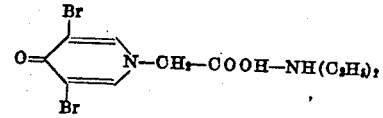

Example 6

31 grams of 3.5-dibromo-4-pyridone-N-acetic acid are dissolved in a concentrated aqueous solution of 8 grams of diethylamine in accordance with the directions of Example 1. The solution is made up to 47 ccm. by the addition of water. 100 ccm. of this solution contain at room temperature 66 grams of the free acid in the form of the diethylamine salt. A concentrated aqueous solution of the corresponding sodium salt contains at room temperature only 39 grams of the free acid in 100 ccm. of the solution. The said diethylamine salt has the formula:

A similar highly concentrated aqueous solution may be obtained from the diethylamine salt of 3.5-dichloro-4-pyridone-N-acetic acid.

While I have described my invention in great detail and with respect to preferred forms and embodiments thereof, I do not desire to be limited to such details and preferred embodiments, since it is obvious for those skilled in the art that modifications may be made and the invention embodied in other forms without departing from the spirit and scope thereof. I therefore desire to cover all forms and modifications of any one or more of the appended claims. I particularly wish to point out that the term "aliphatic amine" used in the appended claims includes amines which are substituted by hydroxy, alkoxy and keto groups.

I claim:

1. An aliphatic amine salt of a halogenated pyridone, substituted by an acid group selected from the group consisting of carboxylic and sulfonic acid groups, which acid group may be connected with the pyridone nucleus through an aliphatic chain, said salt being a colorless and odorless substance which is readily soluble in water with about neutral reaction.

2. An aliphatic amine salt of an iodized pyridone substituted by an acid group selected from the group consisting of carboxylic and sulfonic acid groups, which acid group may be connected with the pyridone nucleus through an aliphatic chain, said salt being a colorless and odorless substance which is readily soluble in water with about neutral reaction.

3. A secondary aliphatic amine salt of a halogenated pyridone substituted by an acid group selected from the group consisting of carboxylic and sulfonic acid groups, which acid group may be connected with the pyridone nucleus through an aliphatic chain, said salt being a colorless and odorless substance which is readily soluble in water with about neutral reaction.

4. A secondary aliphatic amine salt of an iodized pyridone substituted by an acid group selected from the group consisting of carboxylic and sulfonic acid groups, which acid group may be connected with the pyridone nucleus through an aliphatic chain, said salt being a colorless and odorless substance which is readily soluble in water with about neutral reaction.

5. An aliphatic amine salt of a halogenated pyridone substituted by a carboxylic acid group, which acid group may be connected with the pyridone nucleus through an aliphatic chain, said salt being a colorless and odorless substance which is readily soluble in water with about neutral reaction.

6. A secondary aliphatic amine salt of a halogenated pyridone substituted by a carboxylic acid group, which acid group may be connected with the pyridone nucleus through an aliphatic chain, said salt being a colorless and odorless substance which is readily soluble in water with about neutral reaction.

7. An aliphatic amine salt of an iodized pyridone substituted by a carboxylic acid group, which acid group may be connected with the pyridone nucleus through an aliphatic chain, said salt being a colorless and odorless substance which is readily soluble in water with about neutral reaction.

8. A secondary aliphatic amine salt of an iodized pyridone substituted by a carboxylic acid group, which acid group may be connected with the pyridone nucleus through an aliphatic chain, said salt being a colorless and odorless substance which is readily soluble in water with about neutral reaction.

9. An aliphatic amine salt of a halogenated pyridone substituted by the acetic acid radical, said salt being a colorless and odorless substance which is readily soluble in water with about neutral reaction.

10. A secondary aliphatic amine salt of a halogenated pyridone substituted by the acetic acid radical, said salt being a colorless and odorless substance which is readily soluble in water with about neutral reaction.

11. A secondary aliphatic amine salt of an iodized pyridone substituted by the acetic acid radical, said salt being a colorless and odorless substance which is readily soluble in water with about neutral reaction.

12. An aliphatic amine salt of a 3.5-diiodo-pyridone substituted by an acid group selected from the group consisting of carboxylic and sulfonic acid groups, which acid group may be connected with the pyridone nucleus through an aliphatic chain, said salt being a colorless and odorless substance which is readily soluble in water with about neutral reaction.

13. A secondary aliphatic amine salt of a 3.5-diiodo-pyridone substituted by a carboxylic acid group, which acid group may be connected with the pyridone nucleus through an aliphatic chain, said salt being a colorless and odorless substance which is readily soluble in water with about neutral reaction.

14. An aliphatic amine salt of a 3.5-diiodo-pyridone substituted by the acetic acid group, said salt being a colorless and odorless substance which is readily soluble in water with about neutral reaction.

15. A secondary aliphatic amine salt of a 3.5-diiodo-pyridone substituted by the acetic acid group, said salt being a colorless and odorless substance which is readily soluble in water with about neutral reaction.

16. A dialkylamine salt of 3.5-diiodo-4-pyridone-N-acetic acid, said salt being a colorless and odorless substance which is readily soluble in water with about neutral reaction.

17. The diethylamine salt of 3.5-diiodo-4-pyridone-N-acetic acid forming white crystals of the melting point of about 173° C., being readily soluble in water.

18. The bis-hydroxyethylamine salt of 3.5-diiodo-4-pyridone-N-acetic acid forming white crystals of the melting point of 153° C., being readily soluble in water.

19. A dialkylamine salt of 3.5-diiodo-2-pyridone-N-acetic acid forming white crystals, being readily soluble in water.

20. The diethylamine salt of 3.5-diiodo-2-pyridone-N-acetic acid forming white crystals, being readily soluble in water.

JOACHIM REITMANN.